United States Patent [19]

Pustoch

[11] 4,365,415
[45] Dec. 28, 1982

[54] MELON CUTTING TOOL

[76] Inventor: Rene Pustoch, 24-49 23rd St., Astoria, N.Y. 11102

[21] Appl. No.: 299,955

[22] Filed: Sep. 8, 1981

[51] Int. Cl.³ .............................................. B26B 3/00
[52] U.S. Cl. ...................................... 30/314; 30/114; 30/366
[58] Field of Search ................ 30/314, 315, 316, 317, 30/366, 368, 358, 114

[56] References Cited

U.S. PATENT DOCUMENTS

| | | | |
|---|---|---|---|
| 1,117,355 | 11/1914 | Erikson | 30/314 |
| 1,222,961 | 4/1917 | Maker | 30/366 |
| 1,260,226 | 3/1918 | Maker | 30/366 |
| 1,420,341 | 6/1922 | Polk | 30/280 |
| 2,741,025 | 4/1956 | Stewart | 30/368 |
| 2,829,434 | 4/1958 | Schweikert | 30/280 |
| 3,180,383 | 4/1965 | Nudell | 30/114 |
| 3,391,460 | 7/1968 | Moore | 30/358 |

FOREIGN PATENT DOCUMENTS

| | | | |
|---|---|---|---|
| 698142 | 10/1953 | United Kingdom | 30/314 |

*Primary Examiner*—Stephen G. Kunin
*Assistant Examiner*—J. T. Zatarga
*Attorney, Agent, or Firm*—Allison C. Collard; Thomas M. Galgano

[57] ABSTRACT

A melon cutting tool includes an elongated handle portion having a preferably U-shaped cross section which is configured and dimensioned for gripping by the user's fingers and a blade portion secured to the handle portion normally thereof, having a generally notched-shaped cross section.

3 Claims, 4 Drawing Figures

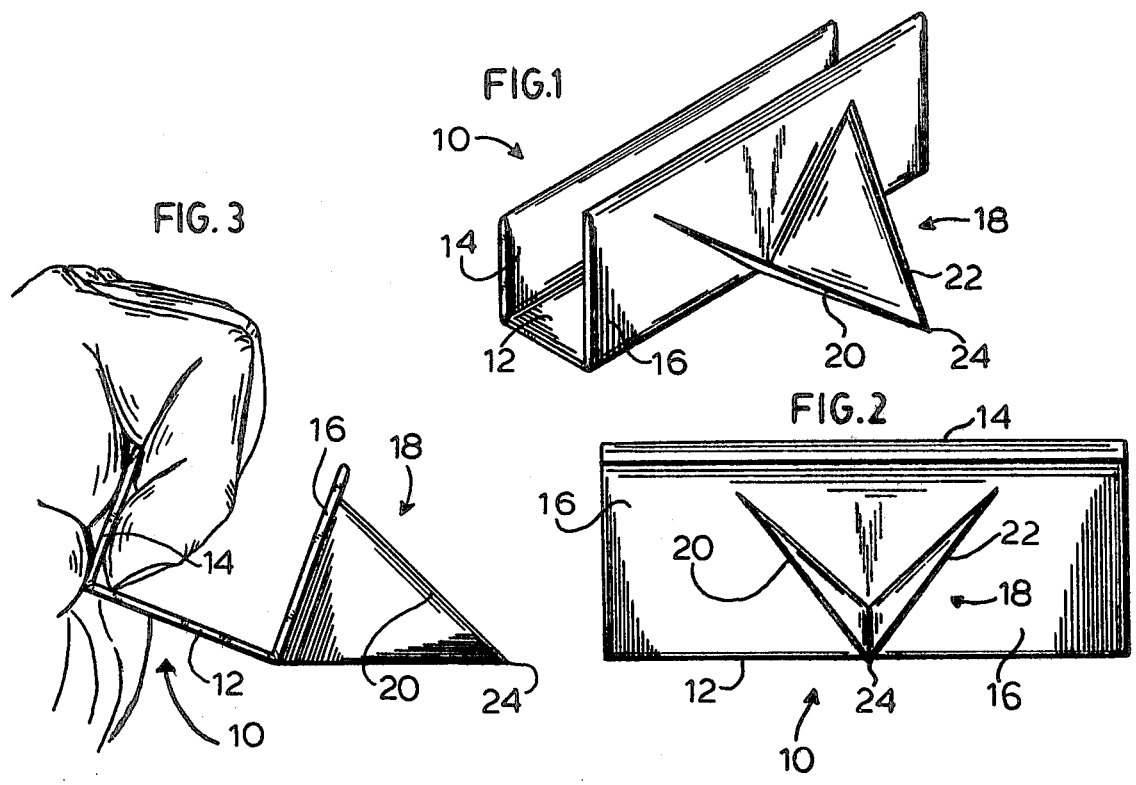
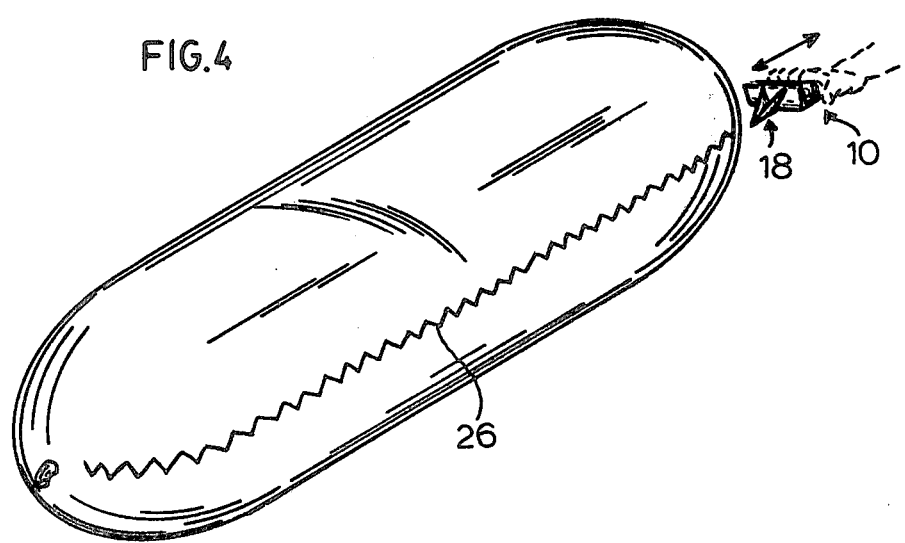

MELON CUTTING TOOL

The invention relates to a cutting or piercing tool. More particularly, it relates to a cutting tool for making decoratively-cut melons for use at parties, weddings and other catered affairs and occasions.

Decoratively-cut melons and, in particular, watermelons, decoratively cut, e.g., in the shape of baskets or the like, typically adorn banquet dessert tables filled with melon balls, mixtures of fruit, etc. These decoratively-cut melons are prepared by hand, typically with just a knife, by piercing the melon repeatedly with oppositely oblique cuts to produce a continuous serrated or sawtooth cut line. As can be appreciated, this is a rather laborious and time-consuming process.

While various food-piercing or shaping implements have been previously proposed for different purposes (see, for example, U.S. Pat. Nos. 1,630,420; 2,167,898 and 593,386), so far as is known, no one has proposed a cutting tool for making decoratively-cut melons and the like which is as simple in construction and use and as highly effective as the tool hereinafter disclosed.

Accordingly, it is an object of the present invention to provide a novel cutting or piercing tool for making decoratively-cut melons.

It is a further object of the present invention to provide such a novel tool which is simple in construction, lightweight, easy to use, reliable in operation, and which is economical to manufacture.

Certain of the foregoing and related objects are readily attained in a melon cutting tool which includes an elongated handle portion, preferably having a generally U-shaped cross section, which is configured and dimensioned for gripping by the user's fingers and a blade portion secured to the handle portion having a notch-like and preferably V-shaped cross section.

Preferably, the handle portion comprises a base wall and two upright sidewalls joined to opposite ends of the base wall and the blade portion is secured to an outer side of one of the sidewalls, centrally thereof.

Most advantageously, the blade portion tapers to a point. It is also desirable that the tool be fabricated from metal.

Other objects and features of the present invention will become apparent from the following detailed description when taken in connection with the accompanying drawing which discloses one embodiment of the invention. It is to be understood that the drawing is designed for the purpose of illustration only and is not intended as a definition of the limits of the invention.

In the drawing, wherein similar reference characters denote similar elements throughout the several views:

FIG. 1 is a perspective view of a melon cutting tool embodying the present invention;

FIG. 2 is a slightly enlarged, bottom elevational view of the cutting tool shown in FIG. 1;

FIG. 3 is a slightly enlarged side elevational view of the tool shown in FIG. 1, further showing the general position of the user's fingers in gripping position; and FIG. 4 is a perspective view showing a series of decorative cuts made in a melon with the cutting tool, with the user's hand shown in phantom line.

Referring now in detail to the appended drawing, therein illustrated is a novel melon cutting tool embodying the present invention which includes a generally U-shaped handle portion 10 and a generally V-shaped blade portion 18. The tool is preferably made from metal, e.g., stainless steel, but other materials such as plastic, wood or a combination of materials, e.g., a plastic handle and a blade with a steel tip, is possible.

Handle portion 10 includes a base wall 12 and two sidewalls 14 and 16 which extend normally relative to the base wall 12 and are secured to opposite edges thereof. Sidewall 14 is preferably slightly smaller than sidewall 16, so as to better accommodate one's hand in the gripping position thereof, as illustrated in FIG. 3.

Blade portion 18 includes two identical triangular blade segments 20 and 22 which are joined along one side. Blade segments 20 and 22 are preferably disposed at an angle of about 90° relative to one another and terminate in a tip 24. Blade portion 18 is secured to the outer side of sidewall 16, centrally thereof, with the base of its "V", as viewed in cross section, terminating adjacent to the lower edge of sidewall 16.

In operation, the tool is gripped in a manner as shown in FIG. 2 and thrust repeatedly into the melon in simple up and down strokes performed laterally adjacent to one another, to obtain a zig-zag or serrated pattern 26, composed of a series of V-shaped notches, such as is shown in FIG. 4. Any desired pattern can, of course, be produced.

Due to the configuration of the U-shaped handle portion 10, not only can one more easily grasp the tool for performing a thrust-like stroke, but it also appears that one can obtain more power or force per stroke, since the full force of one's arm is disposed directly behind the blade. This, of course, allows one to pierce the melon more easily and quickly. In addition, the positioning of the base of the blade at the bottom edge of sidewall 16 (see FIG. 3) allows one to better align successive cuts, since this elongated edge of the tool can be used in a manner comparable to a straight edge.

It should, of course, be realized that various modifications may be made as will be apparent to those skilled in the art. For example, although the V-shaped profile of the blade is preferred, other notch-like configurations such as semicircular, could be employed. In addition, a plurality of blades could be disposed adjacent to one another to produce a series of cuts. Also, other configurations for the handle may be possible, although the U-shaped profile has been found to be extremely advantageous for stroke control and power.

Thus, while only one embodiment of the present invention has been shown and described, it will be obvious that many changes and modifications may be made thereunto, without departing from the spirit and scope of the invention.

What is claimed is:

1. A melon cutting tool, comprising:
   an elongated handle portion having a generally U-shaped cross section and being comprised of a base portion and two upright sidewalls joined to opposite ends of said base wall, which handle portion is configured and dimensioned for gripping by one's fingers; and
   a blade portion secured to an outer side of one of said sidewalls, centrally thereto, and disposed normally to said handle portion, said blade portion tapering generally to a point and having a generally V-shaped cross section.

2. The tool according to claim 1, wherein said tool is fabricated from metal.

3. The tool of claim 1, wherein two planar blade portions disposed at an acute angle relative to one another and joined along a common edge, one end of which said blade comprises the base of said blade as viewed in cross section, terminates adjacent to the lower edge of said one of said sidewalls.

* * * * *